United States Patent [19]

Scheiderich et al.

[11] Patent Number: 4,509,984

[45] Date of Patent: Apr. 9, 1985

[54] METHOD FOR PREPARING TIRE CURING BLADDER LUBRICANT

[75] Inventors: Robert F. Scheiderich; Louis F. Comper, both of Danville, Va.

[73] Assignee: The Goodyear Tire & Rubber Company, Akron, Ohio

[21] Appl. No.: 464,522

[22] Filed: Feb. 7, 1983

Related U.S. Application Data

[63] Continuation of Ser. No. 212,658, Dec. 3, 1980, abandoned.

[51] Int. Cl.³ .................................................. B28B 7/36
[52] U.S. Cl. ........................... 106/38.22; 106/287.14; 106/287.16; 252/28
[58] Field of Search ........... 106/38.22, 287.14, 287.16; 252/28

[56] References Cited

U.S. PATENT DOCUMENTS 3,905,823 9/1975 Piskoti ............................... 106/38.22
4,043,924 8/1977 Traver ................................. 252/28
4,244,742 1/1981 Huber et al. ...................... 106/38.22

Primary Examiner—Lorenzo B. Hayes
Attorney, Agent, or Firm—H. C. Young, Jr.

[57] ABSTRACT

Method for preparing a lubricant composition comprised of clay, polydimethylsiloxane of required viscosity range, poly(ethylene glycol and/or propylene glycol) of required molecular weight range and surfactant.

1 Claim, No Drawings

METHOD FOR PREPARING TIRE CURING BLADDER LUBRICANT

This is a continuation of application Ser. No. 212,658, filed Dec. 3, 1980, now abandoned.

FIELD OF THE INVENTION

This invention relates to tire curing bladder lubricant compositions, tire curing bladders having an outer coating of such lubricant composition, and a method of curing tires utilizing such a coated bladder.

BACKGROUND

Conventionally, pneumatic rubber vehicle tires are produced by molding and curing a green, or uncured and unshaped, tire in a molding press in which the green tire is pressed outwardly against a mold surface by means of an inner fluid expandable bladder. By this method the green tire is shaped against the outer mold surface which defines the tire's tread pattern and configuration of sidewalls. By application of heat the tire is cured. Generally, the bladder is expanded by internal pressure provided by a fluid such as hot gas, hot water and/or steam which also participates in the transfer of heat for curing or vulcanization purposes. The tire is then allowed to cool somewhat in the mold, sometimes aided by adding cold or cooler water to the bladder. Then the mold is opened, the bladder collapsed by removal of its internal fluid pressure and the tire removed from the tire mold. Such use of the tire curing bladders is well known to those having skill in such art.

It is recognized that there is a substantial relative movement between the outer contacting surface of the bladder and the inner surface of the tire during the expansion phase of the bladder prior to fully curing the tire. Likewise there is also a considerable relative movement between the outer contacting surface of the bladder and the cured inner surface of the tire after the tire has been molded and vulcanzied during the collapse and the stripping of the bladder from the tire.

Unless adequate lubrication is provided between the bladder and the inner surface of the tire there is typically a tendency for the bladder to buckle, resulting in a mis-shaping of the tire in the mold and also excessive wear and roughening of the bladder surface itself. Also, the bladder surface can tend to stick to a tire's inner surface after the tire is cured and during the bladder collapsing portion of the tire curing cycle. Further, air bubbles can potentially become trapped between the bladder and tire surfaces and promote tire vulcanizing defects due to lack of adequate heat transfer.

For this reason, it is a conventional practice to precoat the inner surface of the green or uncured tire with a lubricant in order to provide lubricity between the outer bladder surface and inner tire surface during the tire shaping and molding operation. Sometimes the lubricant has been called a lining cement. Conventionally, the inner surface of the green tire, which is typically a rubber gum stock, is simply spray-coated in a confined, ventilated, spray booth, with a lubricant which might, for example, be based upon a silicone polymer. Other additives may also conventionally be utilized in the lubricant composition such as mica, polymeric polyols, cellulose ethers, clay such as bentonite clay and the like. Some lubricants are solvent based and some are water based. Often aqueous soap solutions are utilized. Many lubricant compositions have been taught in the art for such purposes.

However, a conventional practice of spraycoating the inner surface of the green tire with a lubricant composition can result in a relatively high labor intensive operation which can add appreciably to the cost of producing the tire. The tire must be transported to and from the spray booth and time must be allowed for the spray-lubricant coat to dry. Therefore it is desired to provide an enhanced lubrication system as a composition and use thereof for molding or shaping and curing of green tires.

Disclosure and Practice of Invention

In accordance with this invention, a lubricant composition is provided as the product of a mixture which comprises:

(A) about 10 to about 40, preferably about 25 to about 35 parts by weight bentonite clay having a mesh size in the range from about 100 to about 500, preferably about 200 to about 400, U.S. Standard sieve size;

(B) about 15 to about 45, preferably about 25 to about 35 parts by weight polydimethylsiloxane characterized by having a viscosity in the range of about 40,000 to about 120,000, preferably about 50,000 to about 70,000 centistokes at 25° C.;

(C) about 12 to about 36, preferably about 20 to about 30 parts by weight poly(ethylene glycol and/or propylene glycol) characterized by having a molecular weight in the range of about 1500 to about 2500, preferably about 1800 to about 2200;

(D) about 10 to about 25, preferably about 15 to about 20 parts by weight surfactants for said polydimethylsiloxane and poly(alkylene glycol); and (E) optionally, about 4 to about 12 parts by weight of a stabilizer.

The composition for application to the bladder surface is an aqueous emulsion, or dispersion, of the compositions. For example, the composition for such application also contains (F) about 500 to about 1500, preferably about 600 to about 800, parts by weight water which, after application to the bladder, is dried by evaporation. Certainly more water could be used, although additional dilution of the composition should reduce the efficiency of its application.

It is understood that the polydimethylsiloxane may be hydroxyl capped as an ingredient (precursor) in preparing the composition.

In further accordance with this invention, an expandable rubber tire-curing bladder having such a coating composition thereon (particularly after water removal) is provided. In practice, the rubber for the bladder is typically a butyl or butyl-type rubber (copolymer of isoprene and isobutylene). By the term butyl-type, it is intended to mean various modified basic butyl rubbers such as halogen-substituted butyl rubers which may be, for example, chlorobutyl or bromobutyl rubber.

In still further practice of this invention, a method of preparing a pneumatic or semi-pneumatic rubber tire is provided in which a green tire is placed in a tire mold, the coated expandable bladder of this invention positioned therein, the mold closed and bladder expanded by application of internal hot fluid pressure to force the tire outward against the mold surface to shape and cure the tire followed by opening the mold, collapsing the bladder and removing the shaped and cured tire. The bladder is generally connected to an internal part of the tire mold itself.

In more detail, for example, such a method of molding a pneumatic or semi-pneumatic tire which comprises the steps of:

(A) providing or building a green tire with elements which are to be its outer tread for groundcontacting purposes, two spaced inextensible beads, sidewalls extending radially outwardly from said beads to join said tread, supporting carcass with reinforcing elements, and an inner surface of rubber gum stock;

(B) inserting said green tire into a tire mold press and positioning a coated tire cure bladder of this invention inside of said green tire, said bladder being attached to an internal portion of said tire press;

(C) closing the tire mold and expanding said coated tire cure bladder by internal, heated fluid outwardly against the inner gum stock surface of said tire to press the tire outward under conditions of heat and pressure to shape and cure said tire;

(D) opening the tire mold, collapsing said bladder and removing the cured tire having a generally toroidal shape therefrom.

The term "pneumatic tire" relates to tires which rely on an internal fluid, such as air under pressure in their tire cavity for their proper operation when mounted on a rim and the term "semi-pneumatic" tire relates to tires which contain an internal fluid, such as air, in their cavity but do not totally rely on its pressure for its proper operation when mounted on a rim.

In the practice of this invention, the aqueous emulsion or dispersion of the lubricant composition can conveniently be provided by the method which comprises, (A) mixing under high shear mixing conditions about 10 to about 40, preferably about 25 to about 35, parts by weight bentonite clay having a mesh size in the range of about 100 to about 500, preferably about 200 to about 400, U.S. Standard sieve size with about 500 to about 1500, preferably about 600 to about 800 parts by weight water at a temperature in the range of about 20° C. to about 95° C., preferably the water being preheated to about 50° C. to about 85° C., until the mixture appears to be thickened;

(B) mixing therewith about 15 to about 45, preferably about 25 to about 35 parts by weight polydimethylsiloxane characterized by having a viscosity in the range of about 40,000 to about 120,000, preferably about 50,000 to about 70,000 centistokes at 25° C., about 12 to about 36, preferably about 20 to about 30, parts by weight of poly(ethylene glycol and/or propylene glycol) characterized by having a molecular weight in the range of about 1500 to about 2500, preferably about 1800 to about 2200, and surfactant, preferably about 4 to about 10 parts by weight, for said polydimethylsiloxane and poly(alkylene glycol);

(C) optionally mixing therewith about 2 to about 10 parts by weight additional surfactant for reduced friction between bladder and tire;

(D) optionally mixing therewith about 2 to about 8 parts by weight corrosion inhibitor;

(E) optionally mixing therewith about 0.2 to about 1.0 part by weight defoamer;

(F) optionally mixing therewith about 2 to about 10 parts by weight stabilizer.

It is surely appreciated that various relatively well known defoaming agents and various stabilizers can be used in the practice of this invention which are generally well known to those having skill in the pertaining art.

The aqueous emulsion or dispersion is simply coated, such as by spray coating, onto the bladder and dried by evaporation at a temperature, for example, in the range of about 20° C. to about 110° C. It is preferred that the bladder is from about 80 to about 150 percent of its tire curing expanded position or condition for this coating purpose (as opposed to being deflated or collapsed), although it is not considered necessary and bladders have been successfully coated in a somewhat deflated condition.

In the practice of this invention, it has been observed that when utilizing the coating prescribed herein on a rubber bladder, about six to about nine tires could be molded from such bladder (6 to 9 tire cure cycles) until excessive adhesion between the contacting outer surface of the bladder and the inner surface of the tire was experienced, as evidenced by their tendency to excessively stick together upon collapse of the bladder after curing the tire.

It is considered that this number of cure cycles compares favorably with earlier coating compositions with which the inventors have been familiar.

An important part of the lubricant composition, of course, is the presence of the polydimethylsiloxane fluid. However, it is to be appreciated that such a coating had been observed to be somewhat greasy unless the bentonite clay is also used, which not only tends to defeat the greasy appearance of the coated bladder surface but also apparently significantly enables potential trapped air to bleed from the surface. The optional additional soap or surfactant can be beneficial because it apparently can increase slip between bladder and tire.

The optional defoamer can be of a dimethylpolysiloxane emulsion in water which is beneficial because it prevents or inhibits foam formation during mixing.

The practice of this invention is further illustrated by reference to the following example which is intended to be representative rather than restrictive of the scope of the invention. Unless otherwise indicated, all parts and percentages are by weight.

EXAMPLE I

A lubricant composition was prepared according to the following recipe shown in Table 1.

TABLE 1

| Material | Parts |
| --- | --- |
| Bentonite Clay (325 mesh) | 12.5 |
| Water | 759 |
| Polydimethylsiloxane and polyglycol[1] | 62.5 |
| Surfactant[2] | 6.25 |
| Rust Inhibitor (sodium benzoate) | 5 |
| Defoamer | 0.33 |
| Stabilizer | 6.25 |

[1] Reported to be a polydimethylsiloxane viscous fluid having a viscosity of about 60,000 centistokes in a mixture comprised of about 31.3 parts of said polydimethylsiloxane, about 25 parts polypropylene glycol having a molecular weight of about 2000 and about 6 parts surfactant therefor.
[2] A sodium vegetable oil soap which is considered to be optional in nature.

The aqueous emulsion dispersion was prepared according to the following procedure:

(A) Heat the water to a temperature of about 140° F. and add the clay. Mix at 2500 rpm in a Cowles mixer for about 2–5 minutes during which the appearance of the mixture indicates that it has thickened.

(B) Add the organopolysiloxane fluid mixture with high shear at 2500 rpm in order to make a water emulsion.

(C) Add the additional surfactant.

(D) Add the rust inhibitor for the purpose of protecting the applicator apparatus.
(E) Add the defoamer silicone.
(F) Add the stabilizer.

The mixture was spray coated onto the outer surface of the rubber tire curing bladder in its expanded condition. The coating was allowed to dry at about 65° C. The coating was re-applied after about four tire cure cycles with maximum of about 6 hours between coating applications.

The coating was dried for about a minute on the hot (65° C.) bladder surface preform a lubricant composition coating thereon.

The bladder itself was of the butyl rubber type of a generally toroidal shape with overall, expanded condition diameter of about 39 inches and tubular diameter of about 10 inches. Its surface has been pretreated by washing with a hydrocarbon solvent, followed by drying, to remove surface oils and the like.

A radial ply green tire was fabricated of the 11 R 22.5 size.

The tire was placed in a tire mold press and the coated bladder, attached to the mold, inserted inside the tire. The mold was closed and the bladder was expanded by steam at a temperature of about 190° C. to force it against the inside surface of the tire and press the tire outwardly against the outer mold surface so that the tire was shaped as desired and cured.

The mold was then opened, the bladder collapsed and the tire removed therefrom. By this procedure it was observed that about 6 to about 9 tires could be molded from the bladder within about an 8-hour period (cure cycles) before it was necessary to recoat the bladder with the lubricant composition.

Generally, recoating is considered necessary when the bladder excessively sticks to the inner surface of the precured tire when the expanded bladder is collapsed or collapsing after the curing operation.

It is recognized that the inner surface of the tire is typically a compounded rubber gum stock which can be of various rubbers or their mixtures such as natural rubber, cis 1,4-polyisoprene, cis 1,4-polybutadiene, butadiene-styrene copolymer, butyl rubber, holo-butyl rubber such as chlorobutyl and bromobutyl and EPDM (ethylene-propylene-minor amount of diene, terpolymer).

In this example, preparation of a radial ply tire is exemplified. Although the invention can sometimes be considered to be more adaptable to radial ply rather than to bias ply tire production because the bladders are generally required to expand more during a bias ply tire cure cycle, thereby stressing the bladder's surface coat, it is considered that the invention is generally readily adaptable to bias ply tire production.

It is important to appreciate that the tire in this Example was prepared by expanding the coated bladder directly against the inner gum stock surface of the tire to press the tire outward under conditions of heat and pressure to shape and cure the tire. Thus, the coated bladder effectively enabled the preparation of the tire without application of a lubricant coating or liner cement, on the inner surface of the green tire. This is considered significant since it adequately demonstrated that the coated bladder of this invention provided adequate lubrication for a series of sequential tire cure cycles under conditions of heat and pressure, expansion and contraction without the conventional, attendant tire liner cement, or lubricant, pre-coated on the inside surface of the tire. It is reasonably considered that this will result in a considerable savings of labor and material in the preparation of a pneumatic tire. Although it is appreciated that a lubricant precoat could be used on the inner surface of the green tire, if desired, in conjunction with the coated bladder, it is considered important that this Example demonstrated that it was not required.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing an aqueous-based lubricant composition which consists essentially of:
    (A) mixing under high shear mixing conditions about 10 to about 40 parts by weight bentonite clay having a mesh size in the range of about 100 to about 500 U.S. standard sieve size with about 500 to about 1500 parts by weight water until the mixture thickens where said water is preheated to a temperature in the range of 50° C. to about 85° C. prior to mixing said clay therewith
    (B) mixing therewith while maintaining the mixture temperature in the range of about 20° C. to about 95° C., about 15 to about 45 parts by weight polydimethylsiloxane characterized by having a viscosity in the range of about 40,000 to about 120,000 centistokes at 25° C., about 12 to about 36 parts by weight of at least one of polyethylene glycol and polypropylene glycol having a molecular weight in the range of about 1500 to about 2500, and a surfactant for said polydimethylsiloxane and polyglycol and
    (C) optionally mixing therewith about 2 to about 10 parts by weight additional surfactant; about 2 to about 8 parts by weight corrosion inhibitor; about 0.2 to about 1 part by weight defoamer; and about 2 to about 10 parts by weight stabilizer.

* * * * *